Nov. 16, 1965 L. R. KAHN 3,218,393
COMPATIBLE STEREOPHONIC TRANSMISSION AND RECEPTION
SYSTEMS, AND METHODS AND COMPONENTS
CHARACTERIZING SAME
Filed Feb. 11, 1960 5 Sheets-Sheet 1

INVENTOR.
LEONARD R. KAHN
BY
Mattern and Grayreal
ATTORNEYS

Nov. 16, 1965   L. R. KAHN   3,218,393
COMPATIBLE STEREOPHONIC TRANSMISSION AND RECEPTION
SYSTEMS, AND METHODS AND COMPONENTS
CHARACTERIZING SAME
Filed Feb. 11, 1960   5 Sheets-Sheet 2

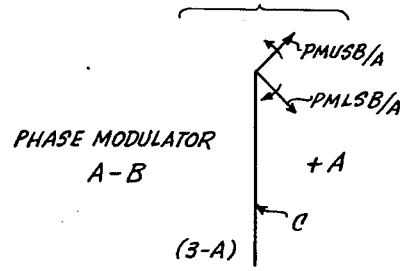
PHASE MODULATOR A−B
(3-A)

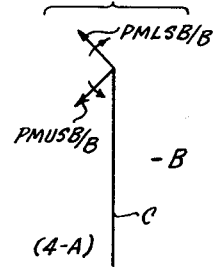
(4-A)

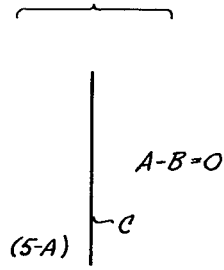
A−B=0
(5-A)

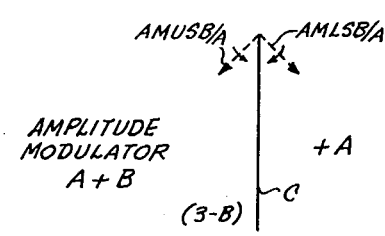
AMPLITUDE MODULATOR A+B
(3-B)

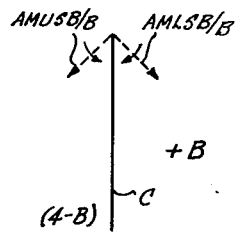
(4-B)

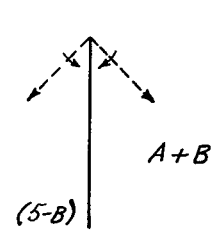
A+B
(5-B)

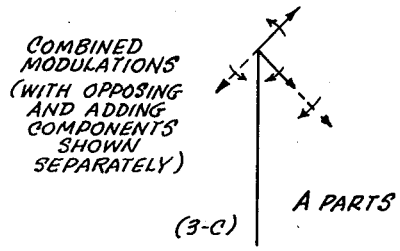
COMBINED MODULATIONS (WITH OPPOSING AND ADDING COMPONENTS SHOWN SEPARATELY)
A PARTS
(3-C)

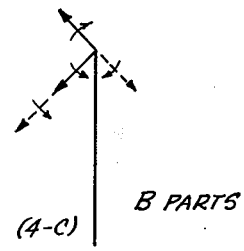
B PARTS
(4-C)

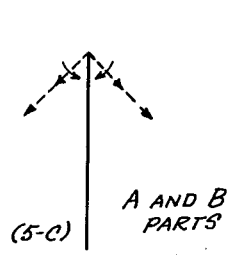
A AND B PARTS
(5-C)

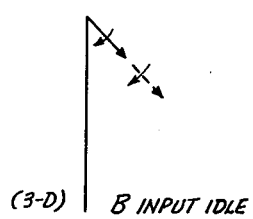
OUTPUT
(3-D) B INPUT IDLE

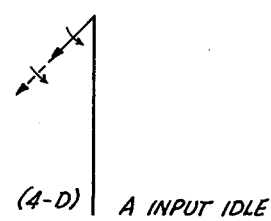
(4-D) A INPUT IDLE

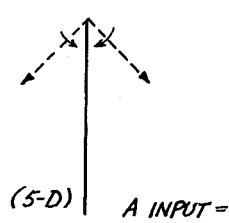
(5-D) A INPUT = B INPUT

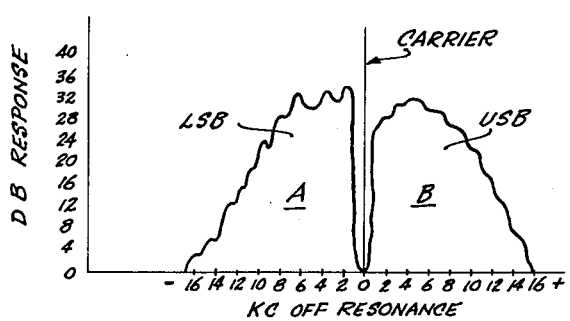
*Fig. 6.*

INVENTOR.
LEONARD R. KAHN
BY
Mattiso and Graybeal
ATTORNEYS

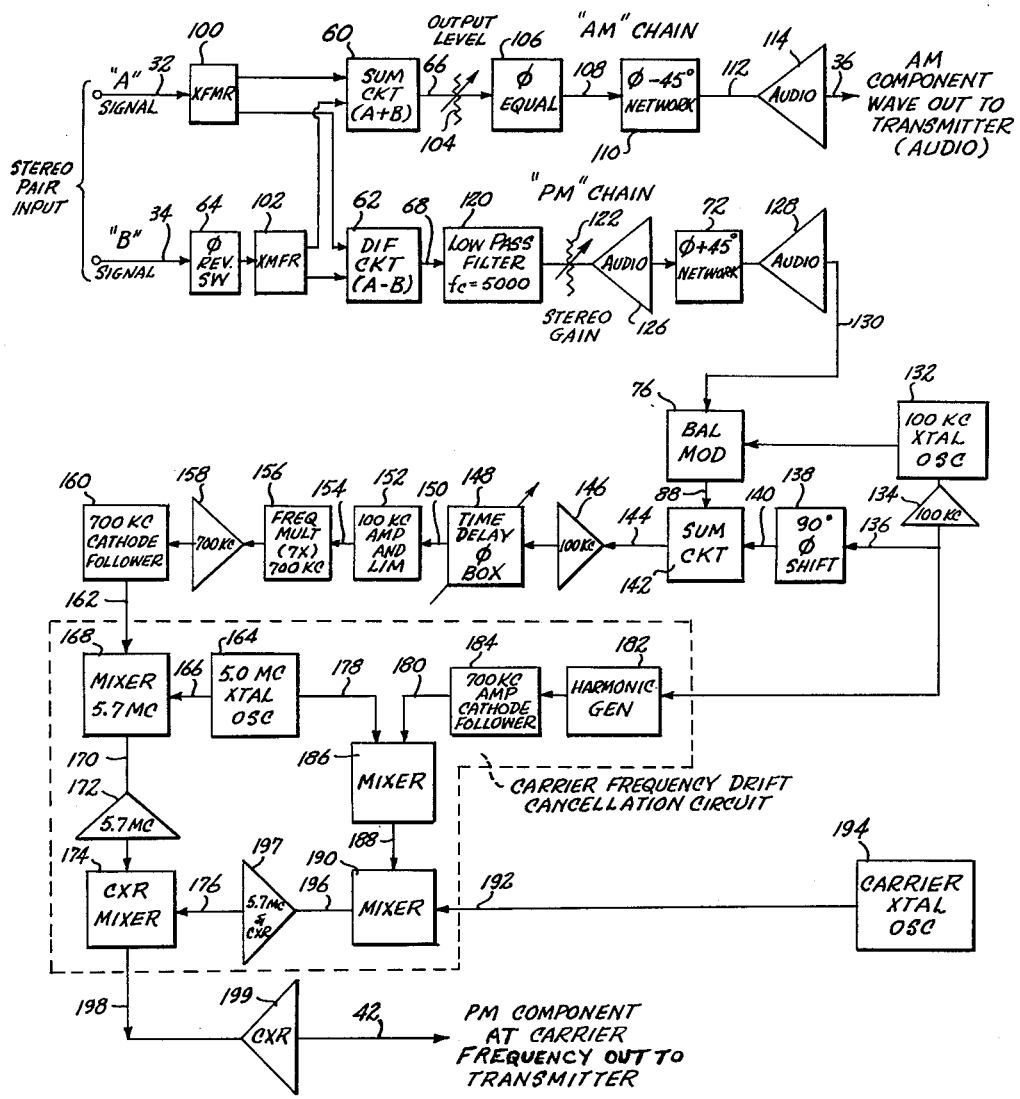

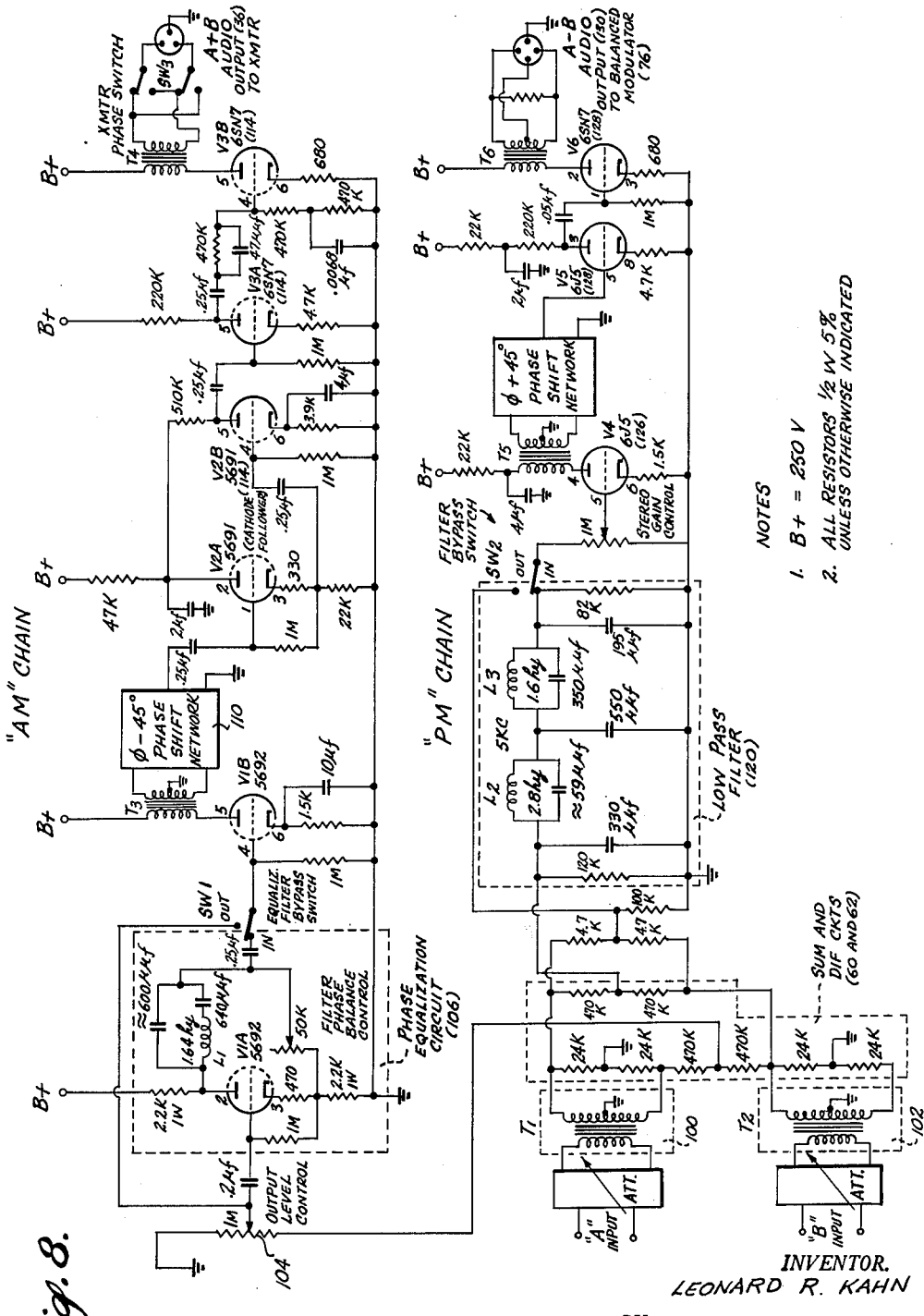

Nov. 16, 1965    L. R. KAHN    3,218,393
COMPATIBLE STEREOPHONIC TRANSMISSION AND RECEPTION
SYSTEMS, AND METHODS AND COMPONENTS
CHARACTERIZING SAME
Filed Feb. 11, 1960    5 Sheets-Sheet 5
TYPICAL RECEIVERS
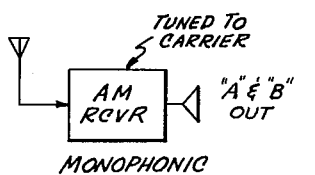
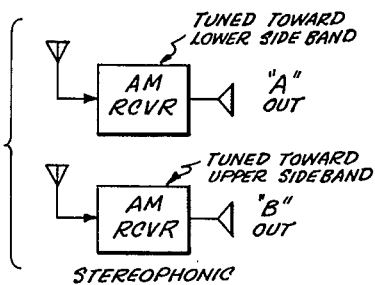
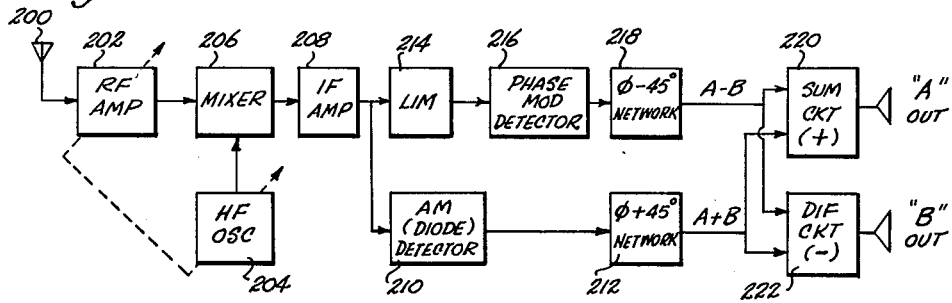
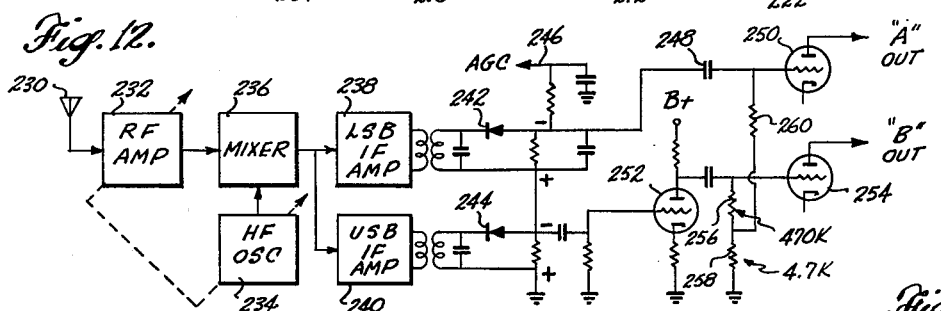
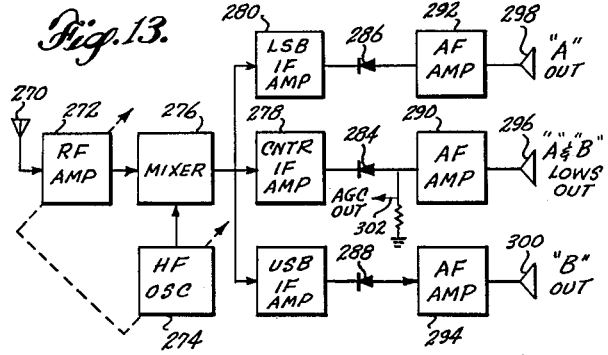
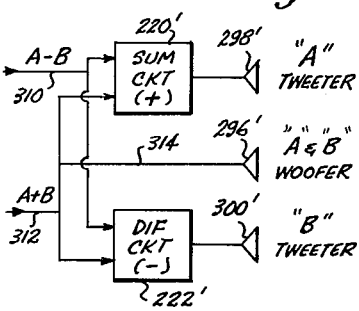
INVENTOR.
LEONARD R. KAHN
BY
Mathis and Graybeal
ATTORNEYS

United States Patent Office 3,218,393
Patented Nov. 16, 1965

3,218,393
COMPATIBLE STEREOPHONIC TRANSMISSION AND RECEPTION SYSTEMS, AND METHODS AND COMPONENTS CHARACTERIZING SAME
Leonard R. Kahn, 81 S. Bergen Place, Freeport, N.Y.
Filed Feb. 11, 1960, Ser. No. 8,073
25 Claims. (Cl. 179—15)

The present invention relates to stereophonic transmission systems, and to typical transmitters, transmitter adapters, and receivers for use therein, and more particularly relates to compatible stereophonic transmission and reception systems for use by amplitude modulated type broadcasting media, whereby stereophonic transmissions can be received by the consumer public by use of conventional amplitude modulation receivers of the envelope detection type, consistent with existing channel allocations, and with appreciable improvement in apparent fidelity of reception by such conventional receivers.

Further and more particularly, objects, features, characteristics and advantages of the present invention include provision of compatible stereophonic transmission and reception systems, and modes of operating same, wherein the stereophonic transmission is fully compatible with existing amplitude modulation type receivers now in widespread use so that one receiving the stereophonic transmissions can achieve full stereo effect simply by use of two amplitude modulated type receivers; wherein simple refinements in receiver design can also be adopted to improve the quality of the stereo signals; wherein a stereophonic transmission and reception system is provided by means of which there is no apparent loss in signal intelligence when the signal is received on a single conventional type amplitude modulation receiver, i.e. monophonically; wherein there is no necessity for an increase in allocated channel frequency for an existing amplitude modulated broadcasting station to adopt full stereophonic transmission; wherein reception of the stereophonically modulated carrier energy can be accomplished by a simple tuning technique on the part of the one operating the receiver means, the tuning technique when reception is by two conventional amplitude modulation receivers being simply that of offset tuning one receiver slightly above the center frequency of the received wave and offset tuning the other receiver slightly below the center frequency of the received wave, such tuning procedure being accomplishable responsive to the audio quality of the signal associated with each such single sideband of the received wave, without necessity of any metering or other specialized signal monitoring equipment; wherein a conventional amplitude modulated receiver offset tuned substantially to a sideband frequency for stereophonic reception actually achieves more apparent fidelity as to quality of the received signals because the bandpass characteristics of the receiver are thereby placed substantially centrally in the audio range represented by the sideband, rather than at one side of the passband as is the case with conventional tuning directly to the carrier center frequency; and wherein combined amplitude and phase modulation techniques are employed in the transmitter component of the system to provide a radiated carrier wave having an amplitude modulation envelope which is substantially a linear function of the summation of two stereo related signals and phase modulated in quadrature relation, with the phase modulation being substantially a linear function of the difference between the two stereo related signals, such composite of amplitude modulation and phase modulation resulting in the two first order sidebands of the carrier wave representing the stereo signal intelligence, one such first order sideband being substantially the intelligence of one of the stereo signals and the other such first order sideband being substantially the intelligence of the other stereo signal.

Before discussing in more detail the stereophonic system characteristic of the present invention, it is believed appropriate to outline certain practical requirements for stereophonic systems, and to give brief indication as to certain other prior and contemporaneous systems. One current proposal involves two independent single-sideband type transmissions, one for the first or "A" stereo input and the other for the second or "B" stereo input, with reception being by upper and lower sideband receiver sections with product demodulation. In reception, one desiring to hear both channels on a single receiver would theoretically be able to do so by tuning to the carrier frequency. Such a system involves serious drawbacks in terms of intolerable distortion when receiving the signal monophonically, and also involves serious practical difficulties in maintaining proper phasing. When one attempts to combine the outputs of two single sideband generators, any slight difference in amplitude and phase between the two sidebands creates severe envelope distortion.

Another system under study involves an A minus B channel with phase modulation and an A and B channel with amplitude modulation, the amplitude and phase modulation techniques not providing for single sideband type transmission, however. As a result, in this system, there is no compatibility regarding stereo reception by two conventional amplitude modulation receivers. Also, in this second type of system, the spectrum requirement is appreciably increased because of substantial out of band radiation.

A third type of system under study involves narrow band frequency modulation for the A minus B channel and amplitude modulation for the A plus B channel, with generally the same disadvantages as the second system discussed, in that the transmission is not compatibly receivable by two amplitude modulation type receivers and because of the necessity for wider spectrum requirements. Also, with this third type of system, there is a very serious problem of bandwidth limitation. The frequency modulation of the carrier results in a reduction in effective bandwidth and the risk of substantial out of band interference, in that the frequency modulation of the carrier causes the amplitude modulation components to swing into the slopes of the IF passband, with resulting second order distortion.

Other stereo systems are also known, involving various techniques such as time difference separation of the stereo input signals, and utilization of subcarrier techniques within the pass band range, and the like, all of which characteristically are not compatible insofar as reception of the full stereo signal by conventional amplitude modulation receiver means, within existing channel requirements.

In order to satisfy commercial stations, regulatory agencies and the user public, a stereophonic system must be compatible with existing receivers, both as to not engendering appreciable signal distortion when received monophonically, and as to reception of the full stereo signal, nor should the stereophonic system signal require any increase in allocated spectrum space. Even now, many amplitude modulation broadcasters are suffering from severe cochannel and adjacent channel interference problems, and certainly any system that would materially increase the bandwidth of the signal is not acceptable. Nor should special receiver means be required for stereophonic reception. Achieving compatibility, as the present invention provides, will permit formulation of stereo standards, after which the segment of the consuming public which demands maximum performance can, if it so desires, proceed to acquire specialized receivers. Once the system is in widespread use, special stereo receiver sets will become commercially practical, both from the manufacturer's point of view and the point of view of the consumer public. But before widespread use can be achieved, compatible stereo reception by existing AM receiver means must be within the capability of an acceptable stereo system. Such advantageous capability is a primary characteristic of the stereo system of the present invention.

These and other objects, features, advantages and characteristics of the stereophonic transmission and reception system of the present invention, as well as components and modes of operating same, will be apparent from the following description of certain typical embodiments thereof, together with the accompanying drawings, wherein like numerals and designations refer to like parts, and wherein:

FIG. 1 is a block diagram of one form of transmitter utilized in practice of the present invention, wherein a stereo adapter is employed in conjunction with a standard amplitude modulation type transmitter, such adapter providing carrier wave generation and deriving from a stereo related pair of audio inputs an RF component wave with the difference between the stereo inputs appearing as phase modulation on the carrier wave, and also deriving an audio frequency wave representing the sum of the stereo inputs and in quadrature relation to the difference signal, which summation wave is utilized in the transmitter to amplitude modulate the carrier;

FIG. 3 is a series of simplified vector diagrams portraying modulation relationships characteristic of the present invention with a single tone input at the A input, with the B input idle;

FIG. 4 is a series of vector diagrams like the series presented in FIG. 3, showing the characteristic modulation relationships when a single tone is applied to the B input, with the A input idle;

FIG. 5 is a series of vector diagrams like those presented at FIGS. 3 and 4, with like single tone inputs at both the A input and the B input;

FIG. 6 is an idealized typical response curve, showing the separation of the intelligence of the stereo related pair of inputs A and B into respective lower and upper sidebands with respect to the carrier, as produced by the modulation technique of the present invention;

Figure 2:
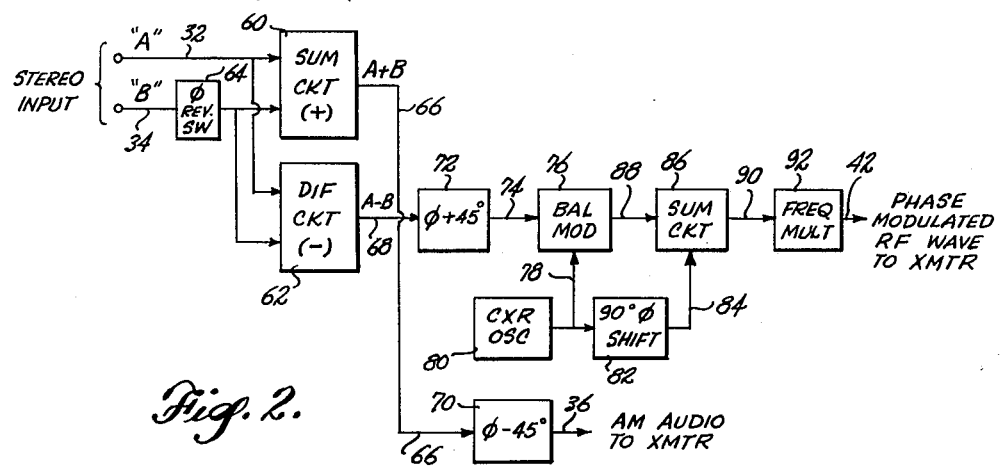
FIG. 2 is a generalized block diagram of the stereo adapter component of FIG. 1.

FIG. 7 is a somewhat simplified but more detailed block diagram of a typical stereo adapter, showing in more detail the development of the amplitude modulated component wave from the summation (A plus B) of the two stereo signal inputs through an AM input chain, and the development of the PM component as a phase modulated RF wave through a PM chain from the difference (A minus B) between the two stereo signal inputs;

FIG. 8 is a self-contained schematic of the audio stages of a typical stereo adapter, showing the AM chain and that portion of the PM chain of the adapter shown in FIG. 2 up to the balanced modulator, with component values and types indicated;

FIG. 9 is a simple block diagram of a conventional amplitude modulation type receiver employing envelope detection, as used to monophonically and compatibly receive the stereophonic signal characteristic of the present invention;

FIG. 10 is a simple block diagram of two conventional amplitude modulation receivers employing envelope detection, as used to stereophonically receive the stereophonic signal characteristic of the present system;

FIG. 11 is a block diagram of a specialized receiver also usable to stereophonically receive the stereophonic signal of the present invention, wherein is employed separation of the intermediate frequency wave, and separate amplitude modulation envelope detection and phase modulation detection to derive the summation and difference audio signals, and audio summation and difference circuitry to isolate the stereo related audio outputs;

FIG. 12 is a diagram, partially in block and partially schematic, of another form of specialized receiver for stereophonic reception of the stereophonic signal of the present invention, wherein two separate, slightly off-tuned intermediate frequency stages are employed, each such intermediate frequency stage feeding separate envelope detectors of the diode type, the specialized circuitry including means summating the outputs of the diode detectors to derive an automatic gain control voltage;

FIG. 13 is a block diagram of another type of specialized receiver usable to stereophonically receive the stereophonic signal of the present invention, employing three IF stages, one such stage being center tuned, and the other two such stages being slightly off-tuned above and below the IF center frequency, such three stages feeding separate audio ouputs with the lows reproduced monophonically and the highs reproduced stereophonically; and FIG. 14 is a fragmentary block diagram of another audio output arrangement employing the stereo speaker display shown in FIG. 13.

Single-sideband generation from a single signal input, using phase shifting elements in conjunction with amplitude modulation, was first proposed by Purington (U.S. Patent No. 2,020,327), and design considerations respecting this type of single-sideband generation have been further developed and reported by O. G. Villard, Jr. in his article entitled "Composite Amplitude and Phase Modulation," appearing in the November 1948 issue of Electronics, at pages 86–89. To date, however, the Purington-Villard system has not been widely used because when high modulation levels are encountered, the system produces severe second order undesired sideband radiation and therefore has proven practical only for low quality sideband operation.

Essentially, the stereophonic system of the present invention employs a composite of single-sideband transmissions, and is characterized by two single-sideband, low level modulations on a single carrier, each sideband of itself being generated similarly to the monophonic single-sideband found in the Purington-Villard system, the two single-sidebands representing the respective stereo input signals at the transmitter. As such, the stereo system here presented is uniquely and advantageously adapted to transmitting the intelligence of a stereo related pair of signal inputs, the stereophonically distinguishable intelligence of one such stereo input being essentially constituted in the upper first order sideband of the carrier wave and the stereophonically distinguishable intelligence of the other stereo input being essentially in the lower first order sideband of the carrier wave. How these modulation characteristics are developed is discussed in more detail below in connection with the simplified vectoral diagrams presented at FIGS. 3–5, and more comprehensive treatment of the basic theory involved can be found in the aforesaid Purington patent and Villard article.

In the new stereophonic system here presented, the percentage of modulation of each sideband is no greater than 50%, at which maximum modulation level the undesired sideband radiation is sufficiently low to render the system commercially practical. Also, in the stereophonic system here presented, the undesired sideband does not have to be extremely low because crosstalk is not a major factor and sideband isolation is more than sufficient to differentiate signals stereophonically.

Reference to the appropriate Bessel functions shows that under conditions of maximum input from one stereo source, the single-sideband isolation of the respective stereo sidebands characteristic of the invention produces a second order side band which is almost 30 db below the carrier amplitude. Thus, a simplified analysis shows the phase modulated component of the characteristics stereophonic wave, when modulated by single tone, to be composed of a carrier and essentially only first order sideband components with the carrier in quadrature relation to the modulating wave. When such phase modulated RF wave is amplitude modulated by the same audio tone that produces the phase modulation, then each spectrum component of the phase modulated wave acts as a modulated carrier which is surrounded by two symmetrical sidebands. In the case of 10% modulation, for example, the amplitude modulated sideband components produced by amplitude modulation of the phase modulatiton sidebands are over 50 db below the carrier amplitude and can be disregarded. Also, the unwanted sideband components tend to cancel out, leaving only the desired sideband component. In essence, analysis demonstrates that the spectrum requirement of the stereo system here presented is similar to that of a standard amplitude modulated system, and actual tests have proven that the signal does not create adverse adjacent or cochannel interference as long as the modulation level is below about 50% in each sideband. Also notable, and quite importantly, the second order sideband on the desired sideband side of the carrier does not introduce distortion but actually reduces the distortion effect on the heterodyned envelope and therefore renders the system compatible with existing amplitude modulation receivers. Even in cases where modulation levels near the maximum of about 50% are employed, the amplitude modulated sideband components produced by amplitude modulation of the phase modulation sidebands are about 20 db below the carrier amplitude and are thus not significant in terms of the apparent quality of the receiver stereo signal.

One practical consideration involved with respect to the present invention is that the desired quadrature relationship between the sum and difference audio signals is achieved by comparatively simple phase shift networks employed at audio frequency levels, which networks are known per se. Practical and suitable design of such networks can readily provide quadrature relationship of the sum and difference signals for audio input frequencies from about 150 c.p.s. to about 7000 c.p.s., and such range of quadrature relationship has been found to be quite satisfactory for purposes of the present invention in that such range includes substantially all of the significant stereophonically distinguishable tones of the stereo signal inputs to the system. It has been determined that the theoretical diminution of the stereo isolation occurring with the very low audio frequencies and the very high audio frequency does not dertact from the apparent stereo effect achieved. Thus, it can be said that the characteristic quadrature relationship between the sum and difference audio signals should hold for at least most of the stereophonically distinguishable audio frequency spectrum, and advantageously from not more than about 150 c.p.s. to at least about 5000 c.p.s. Good stereophonic signal isolation does not require isolation as to all frequencies in the entire audio frequency spectrum, and for practical purposes need not stereophonically differentiate audio frequencies below about 100 c.p.s. or frequencies above about 7000 c.p.s. for the reasons that the very low frequencies are hard for the human ear to distinguish as to direction, and the higher audio frequencies in fact are either not actually heard by a listener or at best do not contribute substantially to the stereo effect when heard compositely with the mid-frequencies. For these reasons, the stereophonically distinguishable audio frequency spectrum can be defined as including audio frequencies from about 100 c.p.s. to about 7000 c.p.s., and is to be so considered for purposes of this disclosure and the following claims.

Concerning the above-discussed practical difference between the full audio frequency spectrum and the stereophonically distinguishable audio frequency spectrum, it is notable that a recently proposed stereophonic speaker display system takes advantage of the lower frequency "blind" area, using a single, monophonic, centrally disposed woofer and two side disposed tweeters for generating the stereo effect. Certain receivers characteristic of the present invention and utilizing such a speaker display arrangement are discussed subsequently in connection with FIGS. 13 and 14. It is also notable with regard to the higher frequency area above about 5000 c.p.s., that a preferable form of the present invention, such as discussed subsequently in connection with FIG. 7 (also cf. 8) includes a low pass filter arrangement in the PM chain to limit the stereo effect frequencies less than about 5000 c.p.s. in order to obtain maximum advantage in terms of the avoidance of adjacent channel interference, it having been determined that this improvement in interference characteristic can be effected without appreciable loss of characteristics stereophonic isolation.

Figure 1:
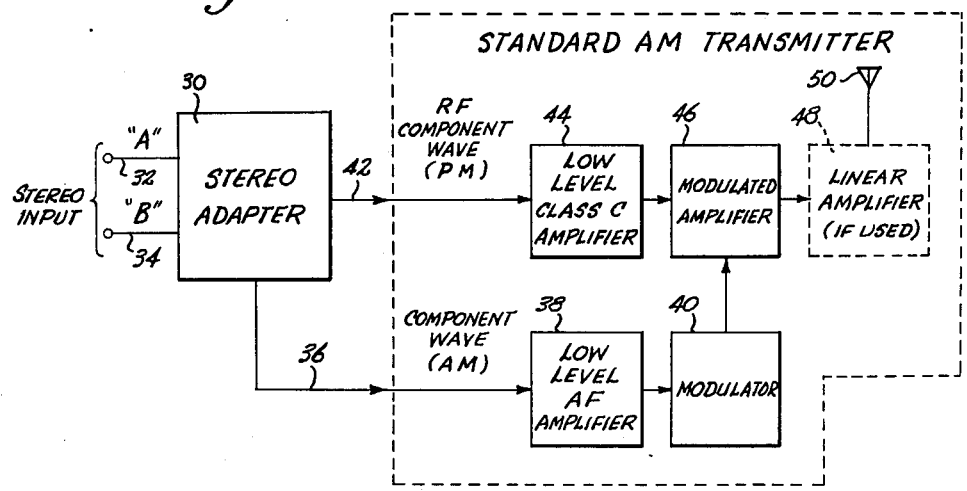

One of the important advantages of the stereophonic transmission system of the present invention is that the system is usable with existing amplitude modulation transmitters whether they be high level, low level or Doherty type transmitters. Advantageously but not necessarily, the equipment can be made in the form of an adapter for use in conjunction with an existing transmitter. Such an adapter is shown in FIG. 1 at 30, the primary purpose of said FIG. 1 being to show how a stereo adapter can be simply related to such standard amplitude modulation transmitter. In terms of functions, such stereo adapter 30 receives as inputs a pair of stereo related audio signal inputs A (designated 32) and B (designated 34) and produces as outputs an amplitude modulation component audio wave 36 fed to the audio system of the transmitter, including low level AF amplifier 38 and modulator 40, and a second output involving an RF phase modulated wave 42 at the carrier frequency of the transmitter. In the typical stereo adapter hereinafter discussed in more detail, the phase modulated component RF wave is of sufficient amplitude to drive the stage following the crystal oscillator in most transmitters or can be fed to a low level class C amplifier 44, the output from which feeds the modulated amplifier 46, the transmitter also employing in some instances a linear amplifier 48 prior to radiation of the modulated carrier wave from antenna 50.

FIG. 2 presents a generalized, functional block diagram of the stereo adapter 30 shown in FIG. 1. In the stereo adapter 30, stereo inputs A and B (32 and 34) are fed to summation circuit 60 and difference circuit 62, the phase of signal B being reversed if appropriate by phase reverse switch 64. The output 66 from summation circuit 60 is a summation (A plus B) of the input signals A and B and the output 68 of difference circuit 62 is the difference between said input signals A and B (i.e. A—B). The respective sum and difference signals appearing in the outputs 66 and 68 are then fed through phase shift networks 70 and 72, the phase of the A plus B signal being shifted $\phi-45°$ in phase shift network 70, and the phase of the A minus B signal being shifted $\phi+45°$ in phase shift network 72, the important consideration with respect the phase networks 70 and 72 being that the two signal outputs therefrom bear a substantially quadrature relation for audio frequencies over at least most of the stereophonically distinguishable audio spectrum, i.e. between audio frequencies from not more than about 150 c.p.s. to at least about 5000 c.p.s. To obtain this relationship, any of several phase shift networks known per se can be employed, either singly or in any combination (such as networks 70 and 72) producing quadrature related outputs. The output 36 from phase shift network 70 is then fed directly to the standard amplitude modulation type transmitter (again note FIG. 1), and is identifiable as the amplitude modulation component wave. The output 74 from phase shift network 72 is fed to a balanced modulator 76, also receiving an output 78 from carrier oscillator 80. A portion of the carrier oscillator output 78 is also fed through a 90° phase shift network 82, the output 84 from which passes to a linear summation circuit 86 wherein the suppressed carrier output 88 from the balanced modulator and the phase shifted carrier at output 84 result in a quadrature modulated wave at output 90 from summation circuit 86. Said output 90 is then multiplied in frequency multiplier 92 to produce the radio frequency desired for signal radiation, and the output 42 from frequency multiplier 92 constitutes the RF phase modulated component wave utilized in the standard amplitude modulation transmitter as the carrier wave input (again note FIG. 1). As will be recognized, elements 76 through 92 constitute a type of phase modulation generator, and some various other known types of phase modulation generators can be employed in lieu thereof, consistent with the mode of operation indicated.

Functionally important to operation of the stereo adapter 30 is the fact that, for audio frequencies over at least most of the stereophonically distinguishable audio frequency spectrum, the two phase shift networks 70 and 72 maintain a substantially 90° relationship between the amplitude modulation component wave and the modulating wave of the phase modulation component wave, resulting in single-sideband type transmission characteristics.

FIGS. 3, 4 and 5 present, in conjunction with the following description, a simplified phasor analysis of the stereophonic modulation technique of the present invention, as viewed at a given instant of time. For simplicity, the illustrations of FIGS. 3, 4 and 5 assume that the level of the signal inputs at A and B is small so that the only significant modulation in the phase modulation branch (i.e. the PM chain) appears only as first order sidebands.

In FIG. 3, a single audio tone (say 1000 cycles per second) is fed to the A input, and the B input is idle. Under this condition, A minus B equals A and the single tone modulates the phase modulator. In FIG. 3-A, the phase modulated upper sideband from input A is designated PMUSB/A and the phase modulated lower sideband from input A is designated PMLSB/A, such phase modulated sidebands being shown vectorally in solid line, for clarity. Said FIG. 3-A shows the relation of the said sideband PMUSB/A and PMLSB/A with respect to the carrier C, and it is to be noted that as is characteristic of phase modulation, the summation of the two sidebands is perpendicular (i.e. in quadrature) to the carrier C. FIG. 3-B shows the amplitude modulation sidebands under the assumed condition with the single tone input to input A and the B input idle. The amplitude modulated upper sideband from the A input is designated AMUSB/A, and the amplitude modulated lower sideband from the A input is designated AMLSB/A, with both such amplitude modulated sidebands being shown vectorally in broken line, for clarity. As charascteristic of amplitude modulation, the sideband components AMUSB/A and AMLSB/A have the resultant thereof in phase with the carrier C, the summation of the modulating waves at the phase modulator being displaced in phase by 90° with respect to the resultant of the modulating waves at the amplitude modulator, i.e. in relative quadrature relation.

Because of the natural displacement between the carrier and sidebands of the two types of modulation and the relative phase difference between the audio modulating waves fed to the two modulators, the modulations when combined establish one sideband pair in phase and the other sideband pair out of phase. Thus, as shown at FIG. 3-C, the combined modulations in the FIG. 3 circumstance are such that the upper sideband components PMUSB/A and AMUSB/A (i.e. the phasors revolving in the counterclockwise direction) are out of phase and therefore cancel and do not appear in the output (FIG. 3-D). The lower sideband components PMLSB/A and AMLSB/A when combined are in phase and add (FIG. 3-C), the resulting output wave as shown at FIG. 3-D being essentially composed of the carrier and the lower sideband, such lower sideband representing the intelligence of the A input (also cf. FIG. 6).

The phasor diagrams of FIG. 4 show the converse circumstance to that shown in FIG. 3, presenting the modulation relationship when the A input is idle and the single tone input is fed to the B input. In this case, again the summation of the phase modulated upper sideband from the B input (PMUSB/B) and the phase modulated lower sideband from the B input (PMLSB/B) is always perpendicular (i.e. in quadrature) to the carrier C (FIG. 4-A), and the amplitude modulated upper sideband from input B (AMUSB/B) and the amplitude modulated lower sideband from input B (AMLSB/B) establish the resultant thereof in phase with the carrier C (FIG. 4-B). In this instance, the components of the lower sideband (PMLSB/B and AMLSB/B) are out of phase and cancel (FIG. 4-C) and the upper sideband components PMUSB/B and AMUSB/B add in phase so that the output (FIG. 4-D) is essentially composed of the carrier and the upper sideband, with the B input intelligence appearing in the upper sideband.

The phasor diagrams of FIG. 5 show the modulation relationship when identical single tone inputs are fed to the A input and the B input, i.e. the situation occurring when the circumstance illustrated in FIG. 3 is combined with the circumstance illustrated in FIG. 4. Since the A input equals the B input, there is no output from difference circuit 62 (FIG. 2), and no phase modulated sidebands on carrier C, as shown at FIG. 5-A. On the other hand, the A plus B component which feeds the amplitude modulator is equal to 2A and therefore twice as much amplitude modulation is produced as would be produced by a single tone input to either input A or input B. In this A plus B situation, as shown at FIGS. 5-B, 5-C and 5-D, the amplitude modulation occurs simply as equal upper and lower sidebands, that is simply a conventional amplitude modulated double-sideband output wave, and properly so in that with equal A and B input signals there is no stereophonically distinguishable information.

From a consideration of FIGS. 3-5, it will be readily recognized and apparent that multi-tone and variant level input situations can each be analyzed as having components like the FIG. 3 and/or FIG. 4 and/or FIG. 5 situations illustrated and that the separation of the stereophonically distinguishable intelligence into two single-sidebands will occur regardless of the composite nature of the audio signals applied at the A and B inputs.

In the above simplified analysis and phasor illustrations of FIGS. 3-5, the percent modulation from the A and B input has been assumed as small, with the result that the amplitude modulation sidebands resulting from amplitude modulation of the phase modulation sidebands are not significant and disregardable. To illustrate, if the input to one of the stereo inputs is zero and the other input is modulated by a tone of sufficient amplitude to produce 10% amplitude modulation, then each phase modulation sideband would be 5% of the carrier amplitude. If this sideband was in turn amplitude modulated to the extent of 10%, it would produce a second order sideband that would be 5% of 5% or 0.25%. It is to be also noted that if the tone has sufficient amplitude to modulate one channel and produce 10% amplitude modulation in one single-sideband, it is in effect equivalent to 20% of the maximum amplitude modulation possible, since the highest percentage modulation which is needed or practical to modulate for stereo effects is about 50%.

FIG. 6 shows a spectrum drawing of a typical stereophonic signal, characteristic of the present invention, the A input intelligence being produced substantially in the lower sideband LSB and the B input intelligence being produced substantially in the upper sideband USB. Obviously, such spectrum pattern does not have a mirror image sideband relationship as is the case with a conventional double-sideband amplitude modulation spectrum. In the spectrum pattern developed by the present invention, at a selected instant each respective single-sideband can consist of (I) stereophonically nondistinguishable intelligence, i.e. components occurring in both inputs and thus in both sidebands, or can consist essentially of (II) stereophonically distinguishable intelligence occurring in but one sideband, or any relative proportions of such stereophonically nondistinguishable intelligence and stereophonically distinguishable intelligence. Thus, it will be seen that the category (I) type of intelligence is simply those input component frequencies where $A=B$ and the intelligence is monophonic, occurring in both sidebands (cf. FIG. 5–D). Likewise, the category (II) type of intelligence is simply those input component frequencies where $A=0$ or $B=0$ and the respective B or A intelligence stereophonically distinguishable (cf. FIGS. 3–D and 4–D). Of course, normal stereophonic signal inputs are quite complex spectrally and the composite situation, with intelligence of both categories present, is the normal operating condition.

FIG. 7 presents a block diagram of a typical stereo adapter generally showing in more detail how the various modulation characteristics, phase shifting and carrier generation functionally indicated in FIG. 2 can be performed. In FIG. 7, the stereo related audio inputs A and B (32 and 34), are transformer coupled through transformers 100 and 102 to summation circuit 60 and difference circuit 62, the B signal input 34 passing through phase reverse switch 64. Summation circuit 60 adds the instantaneous voltages of the two input signals A and B, producing as an output 66 and A plus B signal, and the difference circuit 62 subtracts the instantaneous voltages of inputs A and B, producing as an output 68 the difference signal A minus B. The circuit developing the amplitude modulation component for delivery to the transmitter is denoted for simple identification as the AM chain and the circuitry developing the phase modulated carrier from the difference signal input 68 is similarly denoted the PM chain.

In the AM chain, the output 66 from summation circuit 60 first goes to an output level control 104, the output from which feeds a phase equalizer 106. As will be discussed later, there is preferably a low pass filter in the PM chain, and the function of phase equalizer 106 is to appropriately compensate the AM chain signal for the phase characteristics induced by the low pass filter in the PM chain. Output 108 from phase equalizer 106 goes to a $\phi-45°$ phase shift network 110, whose output 112 is amplified by audio amplifier 114. The output 36 from amplifier 114 is the amplitude modulated component audio wave used to amplitude modulate the phase modulated wave in the associated transmitter. As will be noted, this amplitude modulation component is a function of the summation of channels A and B. This functional feature provides compatibility for monophonic reception of a stereophonically modulated signal, as is discussed more fully below.

As developed in the discussion of the characteristic modulation relationships presented vectorally in FIGS. 3–5, it is a basic function of the PM chain to provide the single-sideband characteristics in the modulated signal as transmitted. The PM chain operates in the following manner. The output 68 from difference circuit 62 (i.e. the A minus B audio wave) preferably feeds lowpass fiber 120, the function of such filter being to restrict the rate of phase modulation to less than about 5000 c.p.s. In actuality, very little stereophonic information is perceptible above about 5000 c.p.s., and it has been determined that some improvement in interference over conventional amplitude modulation systems can be achieved by restricting the stereophonic effect to below about 5000 c.p.s. It is to be noted, however, with respect to utilization of lowpass filter 120 in the development of the phase modulation component wave, that the audio signal input frequencies above 5000 c.p.s. are not lost, but simply appear as conventional double-sideband components (in the AM component wave output from the AM chain). In effect, the filter 120 attenuates the stereo effect above 5000 c.p.s. by attenuating the phase modulation above 5000 c.p.s. Since the maximum modulation from each sideband input is at most only about 50%, and since there is little possibility of the two channels phasing up at frequencies above 5000 c.p.s., there is material improvement in avoidance of adjacent channel interference.

In order to insure good sideband isolation when filter 120 is inserted in the PM chain, the time delay characteristic of the filter is compensated for, as previously indicated, by an all pass phase equalization network 106 in the AM chain so that the temporal relation between the amplitude modulation and phase modulation components is not disturbed. Obviously, such filter 120 and phase equalization network 106 can be bypassed, i.e. switched out, if stereophonic effects over the full audio range are desired. Lowpass filter 120 feeds a stereophonic gain control 122 which in turn feeds a $\phi+45°$ phase shift network 72 through audio amplifier 126. As will be observed, the phase angle of the audio signal fed through the AM chain and the phase angle of the signal fed through the PM chain differ by 90° ($\phi+45°-\phi-45°$) for the reasons discussed regarding FIGS. 3–5.

With regard to proper setting of output level control 104 in the AM chain and the stereo gain control 122 in the PM chain, it appears for all practical purposes that the level of phase modulation should substantially equal the level of amplitude modulation.

The output of the $\phi+45°$ phase shift network 72 feeds audio amplifier 128 and its output 130 is an input to balanced modulator 76. Balanced modulator 76 is also fed a 100 kc. wave from 100 kc. crystal oscillator 132, the output 88 from balanced modulator 76 being a doublesideband, suppressed carrier type wave. Another output from 100 kc. crystal oscillator 132 is fed to 100 kc. amplifier 134, thence as output 136 to a 90° phase shift network 138 whose output 140 is linearly added to output 88 from balanced modulator 76 in summation circuit 142. In summation circuit 142, the suppressed center frequency (100 kc.) missing from output 88 of balanced modulator 76 is restored with its phase shifted 90° by virtue of phase shift network 138. Accordingly, the output 144 from mixer 142, being a linear summation of inputs 88 and 140, has its modulation energy related in quadrature to the center frequency. Thus, instead of being an amplitude modulated wave, such output 144 is a wave closely resembling a pure phase modulated wave. This type of wave is sometimes called a quadrature modulated wave.

The quadrature modulated output 144 from mixer 142 is fed through a 100 k.c. amplifier 146 and a variable time delay phase box 148, which functions to compensate for time delay differences encountered in various types of transmitters with which the adapter may be used. Suitable installation adjustment of said time delay phase box 148 allows the amplitude modulation and phase modulation components to reach the modulation stage 46 (cf. FIG. 1) of the transmitter simultaneously, thus assuring optimum rejection of undesired components.

The output 150 from time delay phase box 148 feeds 100 kc. amplifier and limiter stages, collectively indicated at 152. Such included limiter stage is preferably of the rapid action AGC type, i.e. the gain of the limiter varies as an inverse function of the signal level. Therefore, when the amplitude of the signal is large, the gain is reduced. This compensates for variations in level of the quadrature modulated wave 144 so that a constant amplitude wave is produced in the PM chain. The output 154 from the 100 kc. amplifier and limiter stages 152 goes to a frequency multiplier 156 wherein the 100 kc. wave is multiplied in frequency by a factor of 7, for example. This multiplication factor also increases the amount of phase modulation so that only relatively narrow phase swings are required in the phase shift producing circuitry, with significantly lower modulation distortion than would otherwise be the case. Frequency multiplier 156 feeds 700 kc. amplifier 158 which in turn drives 700 kc. cathode follower 160, the output 162 from which goes to the carrier generating circuit.

The basic function of the remaining portion of the block diagram layout shown at FIG. 7 is to convert the 700 kc. phase modulated output wave 162 from cathode follower 160 to the desired transmitter carrier frequency. Preferably, the equipment includes a carrier frequency drift cancellation circuit, the hereinafter discussed components of which are identified by a broken outline and so designated on said FIG. 7. This circuit includes a 5.0 mc. crystal oscillator 164 providing an output 166 to a balanced mixer 168 wherein are mixed said output 162 from the 700 kc. cathode follower 160 and the 5.0 mc. unmodulated output wave 166 from crystal oscillator 164. The resulting 5.7 mc. summation wave appearing as output 170 from mixer 168 is amplified in 5.7 mc. amplifier 172, then fed to a carrier mixer 174 where it is mixed with a 5.7 mc. plus carrier frequency wave input 176. The 5.7 mc. plus carrier frequency input 176 to carrier mixer 174 is derived in the following manner. Another output 178 from 5.0 mc. crystal oscillator 164, and a 700 kc. output 180 obtained from 100 kc. crystal oscillator 132, through 100 kc. amplifier 134, harmonic generator 182 and 700 kc. amplifier and cathode follower 184, are mixed in mixer 186. Summation output 188 from mixer 186 is an unmodulated wave at 5.7 mc., which is in turn fed to mixer 190 also receiving as an input 192 a signal at carrier frequency from carrier crystal oscillator 194. The summation output 196 from mixer 190 is a signal 5.7 mc. above the carrier frequency. This output 196 is amplified in amplifier 197, and then provides input 176 to carrier mixer 174. Difference frequency output 198 from carrier mixer 174, after being fed through carrier amplifier 199, becomes output 42 and provides the phase modulated wave input to the transmitter (cf. FIG. 1).

The reasons for preferably using a multiplicity of mixing stages (168, 174, 186 and 190) in developing output 42 from the adapter include the following: (1) all frequencies other than those of the modulated carrier frequency are automatically cancelled because the 700 kc. phase modulated wave is added and subtracted during the mixing process, giving effective cancellation of carrier frequency drift, (2) the carrier frequency crystal can be ground to the actual operating frequency of the transmitter rather than being of a frequency displaced by an intermediate frequency, and (3) the intermediate frequency amplifier prevents the 700 kc. phase modulated wave from feeding through the transmitter, thereby avoiding possible interference in the commercial broacast band.

As will be apparent, either an internal or external carrier crystal can be utilized in developing input 192, i.e. as the carrier crystal oscillator 194. As will also be evident, the multiplication factor involved in frequency multiplier 156 and harmonic generator 182 can be other than a factor of 7, as desired under particular design and operating conditions.

FIG. 8 presents self-contained schematic detail as to the AM chain circuit components and PM chain audio circuit components in a typical installation, with only those PM chain components leading up to balanced modulator 76 being thus shown, for simplicity. Also, for simplicity, and in view of the wide variety of known design considerations involved, phase shift networks 72 and 110 are shown in FIG. 8 simply in block. Typical reference articles discussing design considerations regarding such networks are R. B. Dome, "Wideband Phase-Shift Networks," in Electronics, vol. 19, p. 112, issue of December 1946; S. Darlington, "Realization of a Constant Phase Difference," in BSTJ, vol. 24, pp. 94–104, issue of January 1950; H. J .Orchard, "Synthesis of Wide-band Two-Phase Networks," in Wireless Engineer, vol. 27, p.72, issue of March 1950; and O. G. Villard, Jr., "Cascade Connection of 90-Degree Phase-Shift Networks," in Proc. I.R.E., issue of March 1952, at pp. 334–337. Also, suitably rated phase shift networks are commercially obtainable per se.

As has been indicated, the characteristic of the stereophonic system of the present invention which is of primary commercial advantage is its unlimited practicality in terms of compatible reception, either monophonically or stereophonically, by existing conventional amplitude modulation receivers employing envelope detection. To illustrate this in simple terms, FIGS. 9 and 10 respectively present block diagrams of a single such AM receiver and two such AM receivers, as employed to receive the stereophonically modulated signal of the present system. In FIG. 9, monophonic reception of the stereophonically modulated signal is accomplished simply by tuning the receiver to the carrier frequency, in which event the receiver simply detects the amplitude modulation envelope of the signal, i.e. the receiver produces as a monophonic sound output both the A and B stereo signals falling within its bandpass capability. In effect, the monophonic reproduction of the stero signals does not need to distinguish which of the signals is responsible for a given tone, and the monophonic effect produced by the receiver has no apparent distortion in terms of elimination or loss of a portion of the audio intelligence, such as would be the case if the monophonic reception detected only one of two stereo related channels. And, as shown at FIG 10, for stereophonic reception of the stereophonically modulated carrier wave by use of two conventional amplitude modulation receivers employing envelope detection, the reception procedure simply involves slightly off-tuning one such receiver to slightly above the carrier center frequency and slightly off-tuning the other receiver slightly below the carrier center frequency of the received wave, it being of course understood that the two receiver speakers are spaced a suitable distance apart, say six to eight feet, as is conventional practice per se in stereophonic reproduction techniques. With the two receivers thus tuned, the bandpass characteristics of each of the receivers effectively rejects the sideband not desired in each instance, and the respective A signal output and B signal outputs from the receivers compositely create stereophonic reproduction.

An important ramification of the sideband type tuning technique illustrated at FIG. 10 is that, with each receiver slightly off-tuned, the fidelity of the received signals is materially improved because the passband of each receiver is tuned substantially nearer the center of the sideband range, as contrasted with conventional amplitude modulation receiver tuning where the passband center is tuned substantially to the carrier.

In other words, a conventional receiver correctly tuned to a conventional double-sideband wave represents an audio bandwidth equivalent to about half the intermediate frequency bandwidth of the receiver because both sideband components are reproduced. However, in properly tuning toward one sideband of a stereophonic wave such as here presented, wherein each sideband of the wave displays single-sideband characteristics and self-contained intelligence, the audio bandwidth in each receiver is in effect equivalent to the full or at least most of the intermediate frequency bandwidth of the receiver, because each receiver need reproduce but one of the sidebands. It has been determined experimentally that, in the stereo reception mode illustrated in FIG. 8 and with average, home type inexpensive receivers, the tuning of each of the receivers should be offset from the carrier by about 2 kc.–3 kc. for best stereo reception. Actual tests have also shown that the order of stereo separation involved by such offset tuning is more than adequate for full enjoyment of the stereo related signal outputs.

It appears that a listener requires only a comparatively small amount of difference in signal levels in order to determine mid-frequency sound source direction. The isolation capability when using the stereo transmission techniques of the present invention and conventional amplitude modulation receivers in the manner shown in FIG. 10 varies from about 3 db at 500 c.p.s. to about 25 db at 7000 c.p.s. Further and quite importantly, actual tests using the stereo system of this invention have shown no tendency for "switch over" effects, i.e. shifting of the sound rapidly from one side to the other at certain modulation levels and modulation frequencies, which is a serious problem in several other types of stereo transmission and reception systems.

The offset tuning procedure utilizing two conventional amplitude modulation receivers, such as shown in FIG. 10, also provides an improvement in audio frequency fidelity because the high frequency response is enhanced, as has been indicated. Of course, offset tuning of the receivers can in some instances increase possible adjacent channel interference, but this effect is not serious because the slight detuning increases the apparent signal modulation level, and thus increases the desired signal level as well as the interference. Further, as developed in connection with certain typical special stereophonic receiver circuits shown at FIGS. 11, 12 and 13, there are receiver refinements which can readily be employed to improve signal isolation and which do not increase adjacent channel interference. It is most important to keep in mind, however, that special stereophonic receivers for use in conjunction with the system of the present invention are in the category of refinements only, as distinguished from being required to stereophonically receive and present the signals.

FIG. 11 is the block diagram of one such specialized receiver. Such a receiver typically includes components conventional per se to the point of the intermediate frequency output, i.e. includes antenna 200, ganged RF amplifier 202 and high frequency oscillator 204, mixer 206 and IF amplifier 208. The IF output from amplifier 208 is split, one portion being demodulated by a conventional envelope demodulator 210, such as a diode detector, to isolate the A plus B component of the signal, which A plus B component is then converted in phase to $\phi+45°$ by phase shift network 212. The other output portion from IF amplifier 208 feeds a limiter 214 and the phase modulation thereof is obtained by phase modulation detector 216 such as a discriminator and de-emphasis circuit, konwn per se for the purpose, the output from which passes through phase shift network 218 converting the phase thereof to $\phi-45°$, providing the difference signal A minus B. As will be noted, the operation of phase shift networks 212 and 218 are to restore the respective A plus B component audio wave and A minus B component audio wave to an in phase relation. With the phase thereof thus restored, said A plus B and A minus B audio signal waves are fed to a summation circuit 220 and a difference circuit 222, the respective outputs from which are the A signal and B signal, which can be further amplified and sonically reproduced as desired. Such a receiver as shown by FIG. 11, which can also be termed an AM/PM type receiver, has the advantage of achieving a very high order of isolation between the stereo signal outputs. Because the phase modulation characteristic of the instant radiated signal is substantially a linear function of A minus B, use of an AM/PM type receiver for stereo reception is practical and even advantageous. It is to be emphasized that this type of reception is made possible only by the unique relationships of the stereo modulated radiated signal of the present system, wherein there is a linear phase modulation function, a linear envelope function, and single sideband characteristics.

It is also to be emphasized with respect to the AM/PM type receiver shown at FIG. 11, that other stereo systems employing so-called AM/PM type receivers essentially require such special receivers as a necessary consequence of adoption and utilization of such systems. In contrast, the utilization of an AM/PM type receiver such as presented by FIG. 11 is not essential for stereophonic reception in practice of the present invention but is only one of several possible alternatives if reception refinements are desired.

As an incidental characteristic of the AM/PM type of receiver shown at FIG. 11, it is to be observed that operation of such a receiver is limited to situations where the maximum total modulation of the carrier is not more than about 95%, because of the requirement that there be at least some signal level in the limiter 214 at all times in order that it function properly. As known in the art, this requirement of phase modulation discriminators is a well-known characteristic per se, and not a requirement peculiar to the particular type of receiver presented by FIG. 11.

FIG. 12 shows another form of suitable specialized receiver for use as a component in the stereophonic transmission and reception system of the present invention. Essentially, this receiver form employs two intermediate frequency outputs slightly off-tuned toward the lower sideband and the upper sideband, of the intermediate frequency wave derived from the received signal, the extent of preset off-tuning from the IF center frequency in each instance being preferably about 2 kc.–3 kc. Antenna 230, ganged RF amplifier 232 and high frequency oscillator 234, and mixer 236 are conventional per se. The intermediate frequency output from mixer 236 is split and feeds respective lower sideband intermediate frequency amplifier 238 and upper side band intermediate frequency amplifier 240. Transformer coupled outputs from said amplifiers 238 and 240 lead to individual envelope detector circuits respectively including diode 242 and diode 244. To generate a proper AGC output, for reasons discussed below, the diode detector 242 is returned to the high side of diode detector 244, instead of to ground. The AGC output 246 is taken from the top of diode detector 242 and therefore is the combined output of the negative voltages produced by the diode detectors, and provides good AGC control levels irrespective of the relative position of the heterodyned carrier energy in the two IF passbands. If AGC is derived from only one of the detectors, the tuning characteristic would be quite non-symmetrical. The audio output from detector 242 is fed through coupling condenser 248 to the first stage 250 of the A signal audio amplifier circuit. The output from diode detector 244, which is mainly derived from the B signal level is fed through its first audio frequency amplifier 252, the output from which is fed to a second audio amplifier 254 in this channel, and also to a voltage divider circuit consisting of resistance 256 and resistance 258, the portion of the output voltage developed across resistor 258 being fed through resistor 260 to the input of amplifier 250 of the A signal channel. The purpose of the voltage divider circuit consisting of resistances 256 and 258, and accordingly the relative values thereof, are such that the amount of audio signal cross-fed from the B channel to the A channel is just sufficient to cancel out the B signal component derived from the A plus B output of detector 242 and 244, and thus eliminate any detector circuit induced cross-talk in the A channel.

FIG. 13 shows yet another form of specialized receiver for use as a component in the stereophonic transmission and reception system of the present invention, which receiver is particularly adapted to utilization of a recently proposed stereophonic speaker display involving a centrally disposed woofer for monophonic presentation of the lower audio frequencies of "lows," and two spaced tweeters arranged in spaced relation at the sides of the woofer, the tweeters stereophonically presenting the higher audio frequencies of "mids" and "highs" to the listener. One of the prime advantages of such a stereophonic speaker display is that such requires only one woofer, which is the relatively expensive component of a so-called "hi-fi" speaker pair, whereas two separate stereo speaker displays normally require two woofers. Single cabinet mounting of the entire speaker system is also more practical if one woofer is used. Monophonic presentation of the lower frequencies, in the indicated manner, utilizes to advantage the relative directional insensitivity of the ears of the listener to lows, it having been determined that the stereophonic effect primarily results from directional sense as to the relatively higher audio frequencies.

With respect to the receiver and speaker display arrangement contemplated by FIG. 13, and as will be apparent from the following more specific discussion thereof, such provides three separate intermediate frequency stages, with the center tuned IF stage advantageously emphasizing the lower frequencies of both sidebands and driving the woofer, and with the two slightly off-tuned intermediate frequency stages advantageously emphasizing the higher frequencies in the respective sidebands, and driving the respective stereo tweeters.

More specifically, as shown in FIG. 13, this type of receiver arrangement typically includes components conventional per se to the point of the intermediate frequency generation, i.e. includes antenna 270, ganged RF amplifier 272 and high frequency oscillator 274, and mixer 276. The IF output from mixer 276 is divided three ways, providing separate inputs to a center tuned IF amplifier 278 and two slightly off-tuned IF amplifiers 280 and 282, said IF amplifier 280 being slightly off-tuned toward the lower sideband of the intermediate frequency wave derived from the received signal and IF amplifier 282 being slightly off-tuned toward the upper sideband of the intermediate frequency wave derived from the received signal. Similarly to the off-tuning of amplifiers 238 and 240 in the receiver illustrated in FIG. 12, the off-tuned amplifiers 280 and 282 of the receiver shown at FIG. 13 have the extent of off-tuning thereof set so that the respective passband of each such amplifier is offset about 2 kc.–5 kc. from the center frequency of the heterodyned signal. Amplifier 278 is of course center tuned to the IF center frequency. Thus it will be observed that the center of the passband of center tuned IF amplifier 278 coincides with such center frequency and will pass principally the lows of both sidebands, and can readily be designed to emphasize the lower frequencies to an extent and appreciably improve the apparent signal level of the lows. Conversely, the slightly off-tuned IF amplifiers 280 and 282 respectively provide passband characteristics centered at about 2 kc.– 5 kc. toward their related sidebands, and will effectively not only select the appropriate sideband to the substantial exclusion of the other but can also emphasize the highs in its assigned sideband, producing an increase in signal level of such highs.

From respective IF amplifiers 278, 280 and 282 the separated IF signals pass to respective envelope detectors such as diodes 284, 286 and 288, thence to respective audio frequency amplifiers 290, 292 and 294, the output from amplifier 290 driving the centrally placed woofer 296 of the speaker display, the output from amplifier 292 driving the side placed A tweeter 298 of the speaker display, and the output from amplifier 294 driving the side placed B tweeter 300 of the speaker display.

Another advantage of the receiver arrangement presented at FIG. 13 lies in the simplicity with which an accurate AGC output can be derived. Stable AGC control in a stereo receiver is oftentimes a problem because the detected signal level of either of the stereo signals is not a satisfactory indication of the received signal level since, obviously, either or both of the stereo signals can vary considerably or even be momentarily idle without a corresponding change in received signal strength. The circuit shown in FIG. 13 solves this problem very simply by selecting the AGC output at the output from detector 284, as indicated at 302. In that center tuned IF amplifier 278 selects both the carrier and components from both sidebands, the output of detector 284 is responsive to average received signal strength in a manner providing quite acceptable AGC control for the overall receiver.

As will be apparent, a stereo speaker display such as employed with the receiver of FIG. 13 can be used advantageously with any receiver deriving an A plus B audio component, such as the receiver shown by FIG. 11, by way of example. To illustrate, FIG. 14 shows in fragmentary block diagram a simplified arrangement which can replace the output arrangement shown in FIG. 11. The A minus B output 310 and A plus B output 312 are derived in any suitable manner, such as from phase shift networks 218 and 212 of FIG. 11, then fed to sum and difference circuits 220′ and 222′ as in FIG. 11. In the arrangement of FIG. 14, the output of sum circuit 220′ drives A tweeter 298′, the output of difference circuit 222′ drives B tweeter 300′ arranged as in FIG. 13, and the centrally placed monophonic woofer 296′ is driven from an A plus B output 314 to produce a stereo presentation comparable to that employed in FIG. 13.

From the foregoing discussion of certain types of transmitter and receiver arrangements suitable for practice of the present invention, including certain characteristics thereof as well as certain typical and therefore non-limiting system components and operating techniques, various further modifications, variations, and modes of utilization and application thereof will readily occur to those skilled in the art, within the scope of the following claims.

What is claimed is:

1. The method of transmitting a stereo pair of audio signals so as to each be receivable on conventional envelope detection type AM receiver means, comprising generating a stereo pair of audio signals, phase amplitude modulating a radio frequency wave with a first modulating wave which is substantially a linear function of the difference between the two stereo signals, amplitude modulating the phase modulated radio frequency wave with a second modulating wave which is substantially a linear function of the summation of said two stereo signals, maintaining said first and second modulating waves substantially in quadrature relation for modulating frequencies over at least most of the stereophonically distinguishable audio frequency spectrum, and maintaining the corresponding amplitude modulation and phase modulation of the radio frequency wave in quadrature relation to provide an upper single-sideband representing substantially the intelligence of one of said stereo signals and a lower single-sideband representing substantially the intelligence of the other of said stereo signals, and transmitting the modulated radio frequency wave thus produced.

2. The method of claim 1 comprising maintaining the level of phase modulation substantially equal to the level of amplitude modulation.

3. The method of claim 1, wherein the phase relation between the said first modulating wave and the second modulating wave is substantially 90° for modulating frequencies between from not more than about 150 cycles per second to at least about 5,000 cycles per second.

4. The method of transmitting a stereo pair of audio signals A and B so as to each be receivable on conventional envelope detection type amplitude modulation receiver means, comprising generating a stereo pair of audio signals A and B, separately summating and subtracting said signals to produce an A plus B audio wave and an A minus B audio wave, shifting the relative phase between said A plus B wave and said A minus B wave to establish a quadrature relation between at least most stereophonically distinguishable components thereof, phase modulating a radio frequency wave with the phase shifted A minus B wave and amplitude modulating said radio frequency wave with the phase shifted A plus B wave to produce the stereophonically distinguishable intelligence of audio signal A substantially entirely as a first-order single-sideband and the stereophonically distinguishable intelligence of audio signal B substantially entirely as another first-order single-band of the modulated radio frequency wave, and transmitting the modulated radio frequency wave thus produced.

5. Means for transmitting a stereo pair of audio signals so as to each be receivable on conventional envelope detection type amplitude modulation receiver means, comprising means generating a stereo pair of audio signals, means generating a radio frequency wave, means selecting a summation of said two stereo signals, means selecting the difference between said two stereo signals and establishing the phase relation of at least most stereophonically distinguishable frequencies thereof in substantially quadrature relation to the phase of such summation signal, means phase modulating said radio frequency wave with the resulting difference signal, means amplitude modulating the phase modulated radio frequency wave with such summation signal, such amplitude modulation and phase modulation providing that one first-order single-sideband of said wave represents substantially the stereophonic intelligence of one of said stereo signals and another first-order single-sideband of said wave represents substantially the stereophonic intelligence of the other of said stereo signals, and means transmitting the wave thus modulated.

6. In the combination recited in claim 5, means maintaining the level of phase modulation substantially equal to the level of amplitude modulation.

7. The combination recited in claim 5, wherein the phase modulating means establishes a phase relation of substantially 90° between the modulating wave of the amplitude modulation component and the modulating wave of the phase modulation component of the transmitted wave for modulating frequencies between from not more than about 150 cycles per second to at least about 5,000 cycles per second.

8. In a stereophonic transmission system, means producing a pair of stereo related audio signals A and B, transmitter means generating a stereo modulated signal having essentially distortion-free envelope characteristics, said transmitter means including means modulating signal A on a radio frequency carrier wave at a given level of modulation and with the stereophonic intelligence of signal A appearing substantially entirely as a first-order single-sideband receivable by a conventional amplitude modulation receiver means employing envelope detection, said transmitter means modulating signal B on the same radio frequency carrier wave at essentially the same level of modulation as signal A and with the stereophonic intelligence of signal B appearing substantially entirely as a second first-order single-sideband also receivable by a conventional amplitude modulation receiver means employing envelope detection, and means transmitting the said carrier wave thus modulated.

9. In a radio frequency transmitting and receiving system for communicating stereophonic intelligence, transmitter means comprising means generating a stereo pair of audio signals, means generating a radio frequency wave, means selecting a summation of said two stereo signals, means selecting the difference between said two stereo signals, means establishing the phase relation of at least most stereophonically distinguishable frequencies of such difference signal in substantially quadrature relation to the phase of such summation signal, means phase modulating said radio frequency wave with the resulting difference signal, and means amplitude modulating the phase modulated radio frequency wave with such summation signal, the resulting radio frequency wave having at least most of the stereophonically distinguishable intelligence of the first stereo signal appearing substantially entirely as a first order single-sideband, and at least most of the stereophonically distinguishable intelligence of the other stereo signal appearing substantially entirely as the other first order single-sideband, said transmitter means further comprising means radiating the radio frequency wave thus modulated, said system further comprising amplitude modulation receiver means of a type employing envelope detection for receiving the radiated radio frequency wave.

10. A radio frequency transmitting and receiving system according to claim 9, wherein said receiver means comprises an amplitude modulation type receiver having an intermediate frequency stage tuned to the center frequency of the intermediate frequency wave derived by heterodyning the received radio frequency wave, envelope detection means deriving the audio frequency intelligence from the output of said intermediate frequency stage, and audio frequency output means sonically reproducing such audio frequency intelligence, the audio frequency intelligence thus reproduced including at least most of the intelligence of the combined stereo signals.

11. A radio frequency transmitting and receiving system according to claim 9, wherein said receiver means consists of a single amplitude modulation type receiver tuned to the center frequency of the radiated radio frequency, reproducing monophonically at least part of the intelligence of the combined stereo signals.

12. A system according to claim 9, wherein said receiver means comprises means receiving and deriving an intermediate frequency wave from the received wave, means detecting the amplitude modulation envelope of said intermediate frequency wave, means detecting the phase modulation component of said intermediate frequency wave, phase shift means shifting by substantially 90° the relative phase of at least most of the stereophonically distinguishable frequencies of the detected amplitude modulated audio component and the detected phase modulated audio component, the resulting phase shifted phase modulated component being constituted substantially by the difference between the received stereo signals and the resulting phase shifted amplitude modulation component substantially representing the summation of said stereo signals, means summating said sum and difference signals to produce an output representing one of said stereo signals, and means subtracting said sum and difference signals to produce an output representing the other said stereo signal.

13. A system according to claim 9, wherein said receiver means comprising means receiving the transmitted radio frequency wave and deriving therefrom an intermediate frequency wave, three separate intermediate frequency amplifiers, the first of which is center tuned to the center frequency of the intermediate frequency wave, the second of which is offset tuned slightly below the center frequency of the intermediate frequency wave, and the third of which is offset tuned slightly above the center frequency of the intermediate frequency wave, separate envelope detecting means fed by said respective intermediate frequency amplifiers, and audio output means fed respectively from such separate detectors, the output related to the first, center tuned intermediate frequency amplifier representing primarily the lower frequencies from both of the received stereo signals, and the respective output means associated with the said offset tuned intermediate frequency amplifiers representing primarily the higher frequencies of the respective received stereo signals.

14. A system according to claim 13, wherein said various audio output means comprises a stereo speaker display including a centrally disposed "woofer" type speaker driven by the detected audio signal derived from said first, center frequency tuned intermediate frequency amplifier, and two side-disposed "tweeter" type speakers, each at a separate side of said "woofer" type speaker and each separately driven by the output from a respective one of the said offset tuned intermediate frequency amplifiers.

15. In a radio frequency transmitting and receiving system for communicating stereophonic intelligence, transmitter means comprising means amplitude modulating and phase modulating a radio frequency wave and providing an amplitude modulated carrier envelope as substantially a linear function of the summation of the two stereo signals and providing a quadrature related phase modulation of said radio frequency wave as substantially a linear function of the difference between said two stereo signals, the resulting radio frequency wave having at least most of the stereophonically distinguishable intelligence of the first stereo signal appearing substantially as a first order single-sideband, and at least most of the stereophonically distinguishable intelligence of the other stereo signal appearing substantially as the other first order single-sideband, said transmitter means further comprising means radiating the radio frequency wave thus modulated, and said system further comprising amplitude modulation receiver means of a type employing envelope detection for receiving the radio frequency wave, such envelope detection type receiver means further comprising means receiving the transmitted frequency wave and deriving therefrom an intermediate frequency wave, separate intermediate frequency amplifiers respectively offset tuned slightly above and slightly below the center frequency of the intermediate frequency wave, separate envelope detecting means fed by said respective intermediate frequency amplifiers, and audio output means fed respectively from such separate detectors, the output from one such audio output means representing one of the received stereo signals and the output from the other such audio output means representing the other of said stereo signals, the said envelope detection means in turn comprising two individual detector circuits with the first of the detectors being returned to the output side of the second, the circuitry including an automatic gain control output derived from the output side of the first of said detectors so that the automatic gain control voltage is a function of the sum of the detector outputs, the audio output circuitry from said detectors further comprising a first audio frequency amplifier fed by the second of said detectors, a voltage divider circuit across the output of said audio frequency amplifier, and an output from said voltage divider to the output circuit of the second detector which is of a phase and magnitude to substantially cancel from the output of the second detector circuit the output of the first detector circuit.

16. A system according to claim 15, wherein each of said detectors is of the diode type.

17. In a radio frequency transmitting and receiving system for communicating stereophonically distinguishable intelligence, transmitter means comprising means amplitude modulating and phase modulating a radio frequency wave to provide a wave with an envelope representing substantially a linear function of the summation of the two stereophonically distinguishable signals and quadrature related phase modulation representing substantially a linear function of the difference between said two stereophonically distinguishable signals, the radio frequency wave thus modulated having the stereophonically distinguishable intelligence of the first stereo signal appearing substantially as one first order single-sideband, and the stereophonically distinguishable intelligence of the other stereo signal appearing substantially as the other first order single-sideband, said transmitter means further comprising means radiating the radio frequency wave thus modulated, said system further including receiver means comprising a spaced pair of conventional amplitude modulation receivers, each of a type employing envelope detection, one of said receivers being slightly offset tuned above the center frequency of such radiated wave and the other of said receivers being slightly offset tuned below the center frequency of such radiated wave.

18. A radio frequency transmitting and receiving system according to claim 17, wherein each said receiver is offset tuned from the center frequency of the radiated wave by from about 2 kilocycles to about 3 kilocycles.

19. A receiver for receiving a radiant energy carrier wave modulated by intelligence derived from two stereo related signals with the intelligence of one stereo signal appearing substantially as one first order single-sideband of said carrier wave and the intelligence of the other stereo signal appearing substantially as the other first order single-sideband of said transmitted radio frequency wave, said receiver comprising means receiving said transmitted radio frequency wave and deriving therefrom an intermediate frequency wave, means detecting the amplitude modulation envelope of said intermediate frequency wave, means detecting the phase modulation component of said intermediate frequency wave, phase shift means shifting by substantially 90° the relative phase of at least most of the stereophonically distinguishable frequencies of the detected amplitude modulated audio component and the detected phase modulated audio component, the resulting phase shifted phase modulated component being constituted substantially by the difference between the received stereo signals and the resulting phase shifted amplitude modulation component substantially representing the summation of said stereo signals, means summating said sum and difference signals to produce an output representing one of said stereo signals, and means subtracting said sum and difference signals to produce an output representing the other of said stereo signals.

20. A receiver for receiving a radiant energy carrier wave modulated by intelligence derived from two stereo related signals with the intelligence of one stereo signal appearing substantially as one first order single-sideband of said carrier wave and the intelligence of the other stereo signal appearing substantially as the other first order single-sideband of said transmitted radio frequency wave, said receiver comprising means receiving the transmitted radio frequency wave and deriving therefrom an intermediate frequency wave, separate intermediate frequency amplifiers respectively offset tuned slightly above and slightly below the center frequency of the intermediate frequency wave, separate envelope detecting means fed by said respective intermediate frequency amplifiers, and audio output means fed respectively from such separate detectors, the output from one such audio output means representing one of the received stereo signals and the output from the other such audio output means representing the other of said stereo signals, the said envelope detection means comprising two individual detector circuits with the first of the detectors being returned to the output side of the second, the circuitry including an automatic gain control output derived from the output side of the first of said detectors so that the automatic gain control voltage is a function of the sum of the detector outputs, and the audio output circuitry from said detectors further comprising a first audio frequency amplifier fed by the second of said detectors, a voltage divider circuit across the output of said audio frequency amplifier, and an output from said voltage divider to the output circuit of the second detector which is of a phase and magnitude to substantially cancel from the output of the second detector circuit the output of the first detector circuit.

21. A system according to claim 20, wherein each of said detectors is of the diode type.

22. A receiver for receiving a radiant energy carrier wave modulated by intelligence derived from two stereo related signals with the intelligence of one stereo signal appearing substantially as one first order single-sideband of said carrier wave and the intelligence of the other stereo signal appearing substantially as the other first order single-sideband of said transmitted radio frequency wave, said receiver comprising means receiving the transmitted radio frequency wave and deriving therefrom an intermediate frequency wave, three separate intermediate frequency amplifiers, the first of which is center tuned to the center frequency of the intermediate frequency wave, the second of which is offset tuned slightly below the center frequency of the intermediate frequency wave, and the third of which is offset tuned slightly above the center frequency of the intermediate frequency wave, separate envelope detecting means, fed by said respective intermediate frequency amplifiers, and audio output means fed respectively from such separate detectors, the output related to the first, center tuned intermediate frequency amplifier representing primarily the lower frequencies from both of the received stereo signals, and the respective output means associated with the said offset tuned intermediate frequency amplifiers representing primarily the higher frequencies of the respective received stereo signals.

23. A system according to claim 22, wherein the audio output means related to the first, center tuned intermediate frequency amplifier includes an automatic gain control selection and output circuit for the receiver, the automatic gain control signal thus derived being thereby responsive to average received signal strength including primarily the lower frequencies from both of the received stereo signals.

24. A system according to claim 22, wherein said various audio output means comprise a stereo speaker display including a centrally disposed "woofer" type speaker driven by the detected audio signal derived from said first, center frequency tuned intermediate frequency amplifier, and two side-disposed "tweeter" type speakers, each at a separate side of said "woofer" type speaker and each separately driven by the output from a respective one of the said offset tuned intermediate frequency amplifiers.

25. A stereophonic transmission system comprising means producing two stereo related audio signals, means producing a radiant energy carrier wave, means selecting a summation of said two stereo signals, means selecting the difference between said two stereo signals and establishing the phase relation of at least most stereophonically distinguishable frequencies thereof in substantially quadrature relation to the phase of such summation signal, means phase modulating said radiant energy carrier wave with such difference signal, and means amplitude modulating the phase modulated carrier wave with such summation signal, the respective phase modulation and amplitude modulation of said radiant energy carrier wave by such quadrature related difference signal and summation signal establishing at least most of the stereophonically distinguishable components of one such stereo signal as a first order single-sideband on one side of said carrier wave and at least most of the stereophonically distinguishable components of the other such stereo signal as a first order single-sideband on the other side of said carrier wave.

References Cited by the Examiner

UNITED STATES PATENTS

| | | | |
|---|---|---|---|
| 2,164,032 | 6/1939 | Day | 179—15 |
| 2,256,317 | 9/1941 | Earp | 343—207 |
| 2,261,628 | 11/1941 | Lovell | 325—36 |
| 2,378,299 | 6/1945 | Hilferty | 343—206 |
| 2,611,036 | 9/1952 | Norgaard | 179—15 |
| 2,698,379 | 12/1954 | Boelens et al. | 343—200 |
| 2,761,105 | 8/1956 | Crosby | 332—45 |
| 3,103,555 | 9/1963 | Sweeney | 179—15 |

FOREIGN PATENTS 540,185   10/1941   Great Britain.

OTHER REFERENCES

Binaural Transmission on a Single Channel Electronics, February 1941 pp. 34, 35, 36.

Kahn, "Single Side-Band Transmission by Envelope Elimination and Restoration," Proc. of the I.R.E., vol. 40, July 1952, pp. 803–806.

Marx et al., "WABC Field Test of Compatible Single Side-Band Transmission," I.R.E. National Convention Record, pp. 42–54, vol. 6, part 7, 1958.

Seely, "Electron Tube Circuits," New York, McGraw-Hill, 1958, Chapters 17 and 19 relied on.

Article by Sweeney, Electronics, vol. 32, No. 19, May 8, 1959, pages 56–58.

Compatible Stereo Radio Using AM/FM Multiplex Electronics, May 8, 1959.

Harmon: "Experience with CSSB at KDKA" in NAB Engineering Handbook, 5th Edition, New York, McGraw-Hill, 1960, pp. 8-41 to 8-52.

DAVID G. REDINBAUGH, *Primary Examiner.*

HERMAN K. SAALBACH, GEORGE N. WESTBY,
*Examiners.*